Fig. 1.

PAIGE B. HOOPER
INVENTOR.

PAIGE B. HOOPER
INVENTOR.

BY
ATTORNEY

May 5, 1970 P. B. HOOPER 3,510,224
SELF-BALANCING SPECTROPOLARIMETER WITH A SERVO LOOP
COMPENSATED FOR CHANGES IN VERDET CONSTANT
Filed July 10, 1964 4 Sheets-Sheet 4

PAIGE B. HOOPER
INVENTOR.

BY
ATTORNEY

United States Patent Office 3,510,224
Patented May 5, 1970

3,510,224
SELF-BALANCING SPECTROPOLARIMETER WITH A SERVO LOOP COMPENSATED FOR CHANGES IN VERDET CONSTANT
Paige B. Hooper, Glendora, Calif., assignor, by mesne assignments, to Cary Instruments, Monrovia, Calif., a corporation of California
Filed July 10, 1964, Ser. No. 381,696
Int. Cl. G01n 21/44; G01j 3/42
U.S. Cl. 356—97                                17 Claims

ABSTRACT OF THE DISCLOSURE

A monochromatic beam of varying wavelength is transmitted through a polarizer where it is plane polarized and is then transmitted through a sample and a Faraday core and then through an analyzer to a photocell. The core of the Faraday cell is subjected to the influence of an oscillating magnetic field which causes the plane of polarization of the beam striking the analyzer to oscillate angularly by an amount proportional to the Verdet constant of the material in the Faraday core. A corresponding alternating current developed in the output of the photocell is applied to a servomotor and gear train to rotate the polarizer toward a position which causes the average position of the oscillating beam to be crossed with the analyzer. In this invention, a common control is employed for scanning the spectrum and for varying the transmission coefficient of the servo loop to stabilize the transfer coefficient of the servo loop. In this way, overshooting and sluggishness of the servo system are prevented.

---

This invention relates to self-balancing spectropolarimeters and more particularly to a system for correcting the overall servo response characteristics of a self-balancing spectropolarimeter so as to produce a substantially uniform self-balancing action over a wide range of wavelengths.

In a spectropolarimeter of the type to which this invention is particularly applicable, a specimen or sample under investigation is normaly located on a light path between a polarizer and analyzer. In addition, a Faraday cell that is subjected to the influence of an oscillating magnetic field is located on the path between the polarizer and the analyzer. In a spectropolarimeter of the type to which the invention has been particularly applied, monochromatic radiation is transmitted along a light path in turn through the polarizer, through the specimen under investigation, through the Faraday cell, and through the analyzer to a photocell. The wavelength of the monochromatic radiation is varied during the course of the analysis.

When a specimen under investigation exhibiting optical activity is placed in the path of the beam, the plane of polarization rotates about the optical path and the analyzer transmits to the photocell that component of the beam which lies in the plane of polarization of the analyzer. In practice where the specimen exhibits optical activity, the plane of polarization is rotated by an amount proportional to the distance traveled by the radiation in the sample. The amount of rotation or other effect that is produced also depends upon the wavelength of the radiation. The term "optical rotatory dispersion" is applied to the variation of of optical rotation with wavelength.

In a particular type of spectropolarimeter to which this invention is applicable, the polarizer and the analyzer are oriented in such angular positions about the optical axis, that light polarized by the polarizer is incident on the analyzer with the plane of polarization of the incident light perpendicular to the polarization plane of the analyzer thus resulting in a null or extinction condition.

A Faraday cell employed in polarimeters which embody this invention includes a Faraday coil wound on a Faraday core. The core is composed of a material which rotates the plane of polarization through an angle that depends on the strength and direction of the component of the magnetic field along the path of the beam. In such a cell the angle of rotation of the plane of polarization is proportional to the strength of the magnetic field along the axis of the core and in particular, therefore, is proportional to the current flowing through the coil. In the type of spectropolarimeter with which this invention is concerned, a sinusoidal alternating current of fundamental frequency is applied to the Faraday coil to cause the plane of polarization of radiation transmitted therethrough to oscillate about a mean position. With this arrangement, an alternating current of fundamental frequency is generated in the photocell. The null or extinction condition is ascertained by adjusting the relative orientation of the polarizer and analyzer to reduce the current component of fundamental frequency in the output of the detector to minimum or zero value. The extent of the rotation of the plane of polarization in a Faraday cell is a function of the magnitude and direction of the current applied to the coil.

In one type of spectropolarimeter to which this invention applies, the polarizer or the analyzer is rotated to compensate for the rotation introduced by the specimen, and the compensating rotation is produced automatically in response to the alternating current output of the photocell as the wavelength of the monochromatic light is varied. The automatic compensation is produced by means of a servo system which rotates the polarizer or the analyzer in response to the alternating current generated in the photocell. This invention concerns itself with systems for making this automatic response stable throughout the spectrum uniform so that the response speed will not be excessively high, causing overshooting in some regions of the spectrum, and will not be excessively low, causing sluggish operation, in other regions of the spectrum.

The response of the servo-system depends in part on the amplitude of the alternating current that is fed thereto. This amplitude varies in part by virtue of the fact that the intensity of monochromatic light being transmitted to the photocell depends upon the wavelength, partly by virtue of the fact that the intensity of radiation entering the polarizer varies with wavelength, and partly because the transmission coefficient of the specimen under investigation varies with wavelength, and also partly because the photosensitivity of the photocell varies with wavelength. In addition, the amplitude of the current varies because of the fact that the core of the Faraday cell produces a rotation of the plane of polarization which depends not only on the amplitude of the AC current applied to the Faraday coil, but also because the effect of the core varies with wavelength. This effect is measured in terms of a Verdet constant. Heretofore, compensation has been made for variations in the intensity of the monochromatic beam and the absorbtivity of the sample. A system for providing such compensation at any one wavelength is disclosed in Cary Pat. No. 3,312,141. It has been found that such correction is not sufficient to provide a uniform response characteristic in a servo-system as the wavelength is varied. It has been discovered that this deficiency is largely accounted for by the fact that the Verdet constant of the Faraday core varies with wavelength. According to this invention, the response of the system as a function of the wavelength of the monochromatic beam is adjusted to compensate not only for variations in light intensity and photocell sensitivity but also for variations in Verdet constant with wavelength.

The Verdet constant is defined as a proportionally factor in the rotatory action of the Faraday effect which varies with the wavelength of the polarized light being transmitted through the core of the Faraday cell. It is the factor V in the following relationship for the rotation of the plane of polarization of light by transparent substances in a magnetic field:

$$\alpha = VlH$$

where
$\alpha$ = the angle of rotation
$l$ = the length of the path, and
$V$ = the Verdet Constant of the material
$H$ = the intensity of the magnetic.

Inasmuch as the Verdet constant V of the material in the core varies with wavelength and the intensity H of the magnetic field is proportional to the current flowing in the coil of the Faraday cell, it is thus clear that when an alternating current flows in the coil, the plane of polarization of the beam oscillates about an average position. This average position is the deviation of the plane of polarization of the beam striking the analyzer from the extinction position.

In accordance with this invention, in its most effective embodiment, automatic means are provided for varying the sensitivity of the photocell circuit to produce a relatively contsant DC output irrespective of variations in the intensity of the beam striking the analyzer and irrespective of variations in sensitivity of the photocell itself. In addition, compensation is introduced for modifying the sensitivity of the spectropolarimeter to the AC current applied to the Faraday coil. The sensitivity is varied as a function of wavelength so that the amplitude of the AC current applied to the servo-system for self-balancing the spectropolarimeter for a predetermined deviation is of substantially constant amplitude.

In one method of carrying out the invention the amplitude of the AC current applied to the Faraday coil is varied as a function of wavelength during the scanning of the spectrum so that the amplitude of oscillation of rotation of the plane of polarization of radiation is substantially constant independently of wavelength.

In another method of applying the invention, the gain of an amplifying element in the servo-system is varied as a function of wavelength to compensate for variations in the amplitude of oscillation in the plane of polarization caused by variation of the Verdet constant as a function of wavelength.

With this invention, the characteristics of the servo-system are so adjusted as a function of wavelength as to cause the servo-system to operate in a relatively uniform manner to compensate for polarization introduced by the sample without overshooting or sluggishness throughout a predetermined spectral-range.

One way to provide compensation in accordance with this invention is to provide a directly coupled mechanical link between the wavelength setting mechanism of the monochromator of the spectropolarimeter and a gain control element in the amplifier in the servo-loop to adjust the gain as a function of wavelength.

Another way in which compensation for the variations in detector output as a function of wavelength is made in this invention is to adjust the power supply regulator for the photodetector so as to vary the normal level of the photodetector output in an inverse relation to the amplitude of oscillation of the plane of polarization.

The invention, together with the foregoing and other features and advantages thereof is described in connection with the accompanying drawings in which:

FIG. 5 is a graph of a system gain as a function of the angle of rotational modulation of the light beam;

GENERAL DESCRIPTION

Figure 1:
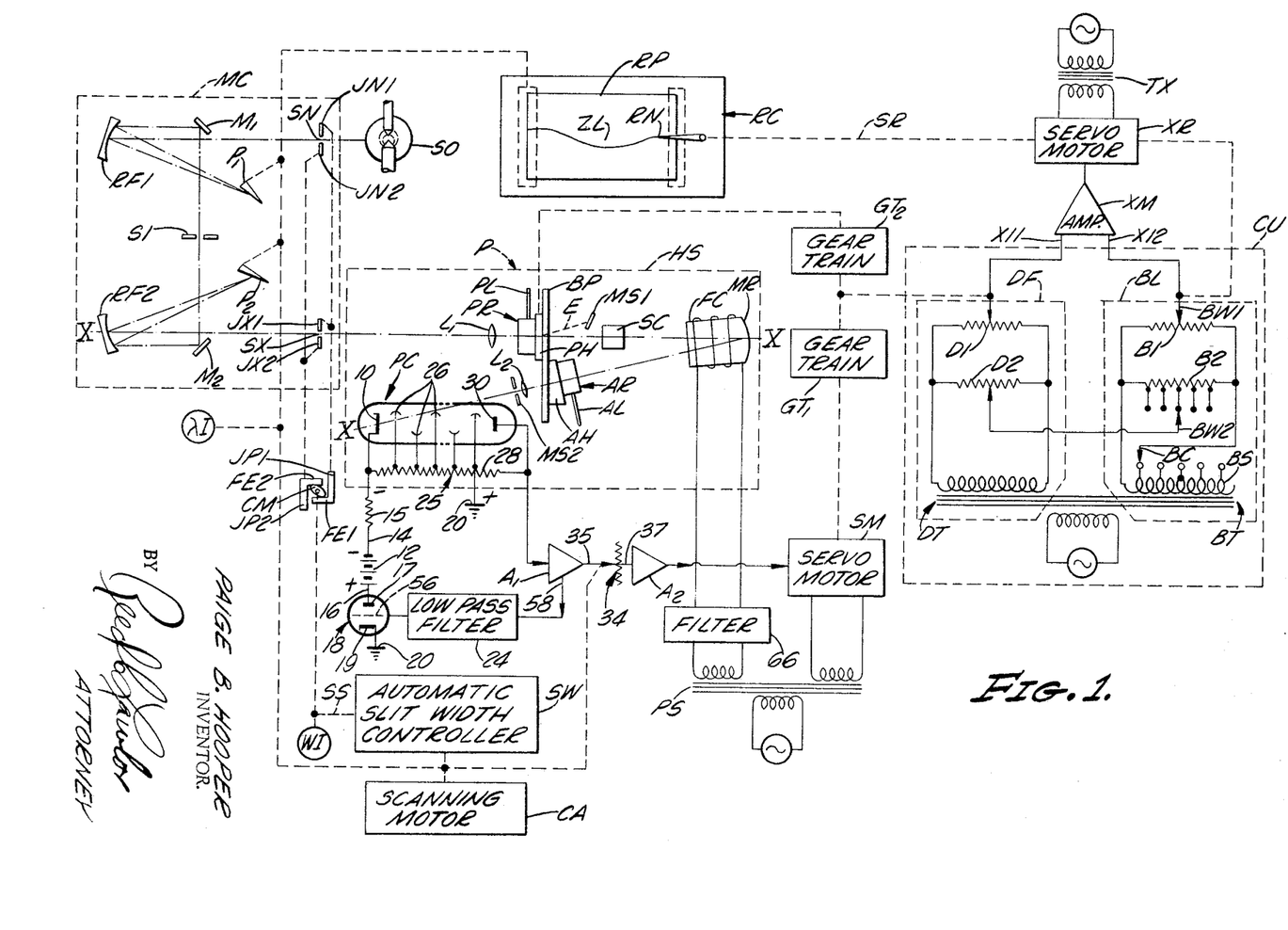
FIG. 1 is a schematic diagram of a spectropolarimeter embodying this invention.

In the spectropolarimeter illustrated in FIG. 1 white light from an intense source SO, such as a Xenon arc lamp, enters a monochromator MC where it is dispersed spectrally so that a portion of the light in a narrow wavelength band is emitted from the monochromator MC. This emitted radiation is transmitted along an optical axis X—X through the polarimeter unit P. In the polarimeter unit, light traveling along the axis X—X passes through a first lens $L_1$, a polarizer PR, a sample cell SC, a modulated Faraday cell FC, an analyzer AR and a second lens $L_2$ to a photocell, or light, detector in the form of a photomultiplier, PC. The polarizer PR, sample cell SC, and Faraday cell FC are mounted in a common light-tight housing HS. The AC current developed in the photocell PC is employed to operate a servomotor SM to rotate the polarizer PR an amount equal and opposite to the rotation introduced by the placing of a sample in the sample cell SC. The servo-motor SM actuates a recorder RC to produce a spectropolarogram RP which displays the manner in which the rotation introduced by the sample varies with wavelength.

The spectropolarimeter of FIG. 1 is of the extinction type. In such a polarimeter the plane of polarization of the beam incident on the analyzer AR after passage through the polarizer PR, the sample cell SC, and the Faraday cell FC, is perpendicular to the polarization plane of the analyzer thus minimizing the amount of light striking the photocell PC. In the spectropolarimeter illustrated, the polarizer PR and the analyzer AR are rigidly mounted on a common floating baseplate BP in close juxtaposition to each other. As indicatetd in FIG. 2 the Faraday cell FC is provided with a water filled core FR having a mirror MR at one end thereof for reflecting to the analyzer the light that has been transmitted into the Faraday cell from the polarizer. Such a polarimeter is described and claimed in copending patent application Ser. No. 348,346, filed on Mar. 2, 1964, by Henry H. Cary.

The monochromator MC is a double monochromator. The monochromator comprises an entrance slit SN into which radiation from the source SO is directed. This radiation is separated into its spectral components by means of a pair of dispersing prisms $P_1$ and $P_2$ thereby causing a spectrum of the radiation to be formed within the monochromator MC adjacent the exit slit SX.

White light entering the entrance slit SN is directed to a first collimating mirror RF1 which reflects the radiation to the first dispersing prism $P_1$ which in turn returns dispersed radiation to the first collimating mirror RF1 and thence to the first flat mirror $M_1$ which in turn directs the focused spectrum of the radiation at an intermediate slit SI. The radiation that lies in a narrow band of wavelength and that is transmitted through the intermediate slit SI is reflected by a second flat mirror $M_2$ to a second collimating mirror RF2 to the second dispersing prism $P_2$ which in turn disperses the radiation further and reflects the dispersed radiation to the collimating mirror RF2 which in turn focuses a spectrum of the radiation at the exit slit SX, thus causing monochromatic radiation of high purity to emerge from the exit slit SX along the optical axis X—X. A scanning motor CA coupled to the prisms $P_1$ and $P_2$ by means of cams causes the spectrum to be scanned by the exit slit SX and thus to change the wavelength of the emitted monochromatic radiation. The shape and intensity of the monochromatic beam that is emitted is defined by an aperture stop formed by a mask MK on the second prism $P_2$ and by the aperture stop formed by the exit slit SX. In other words, the monochromatic radiation that is avialable for use by the polarimeter unit P is defined by a somewhat pyramidally-shaped or pie-shaped beam with the monochromator having at one end a base formed by the virtual image of the prism $P_2$ formed behind the second collimating mirror RF2 and having at the other end a peak defined by the narrow rectangular slit SX.

The manner in which the light grasp is varied during the scanning of the spectrum has been explained in detail in my co-pending application Ser. No. 348,347, filed on Mar. 2, 1964.

In the spectropolarimeter of FIG. 1, the first lens $L_1$ forms a real image of the aperture stop within the sample cell SC and a virtual image of the monochromator exit slit SX at infinity. The mirror MR of the Faraday cell FC forms a real image of the exit slit SX behind the Faraday cell. The lens $L_2$ also forms a virtual image of the aperture stop between the mirror MR and the sample cell SC and lens $L_2$. The second lens $L_2$ forms a real image of the aperture stop at the photocell PC. The principles by means of which the focal lengths of the lenses $L_1$ and $L_2$ and the focusing mirror MR are designed and the principles by means of which the various parts of the polarimeter can be spaced along the optical axis X—X relative to each other to cause the various images to be formed at specified locations are well known in the art and need not be described herein.

The sample cell SC is located on the branch of the optical axis X—X between the polarizer PR and the Faraday cell FC, but it may be located elsewhere between the polarizer PR and the analyzer AR.

The polarizer PR and the analyzer AR may be of conventional type such as a Senarmont or a Rochon prism PZ and PA. Each of these prisms permits an ordinary ray to be transmitted along a straight line therethrough but causes an extraordinary ray E to be deflected from that straight path. The planes of polarization of the ordinary and extraordinary rays are perpendicular to each other. The plane of polarization of the ordinary ray is here referred to as the plane of polarization of the polarizer PR of the analyzer AR as the case may be. A black mask MS1 mounted within the housing HS is employed to absorb the extraordinary ray passing through the polarizer PR. Likewise, an apertured mask MS2 is employed to permit only the ordinary ray passing through the analyzer AR to be transmitted to the photocell PC.

Figures 2, 3, 4, 5A, 5B:
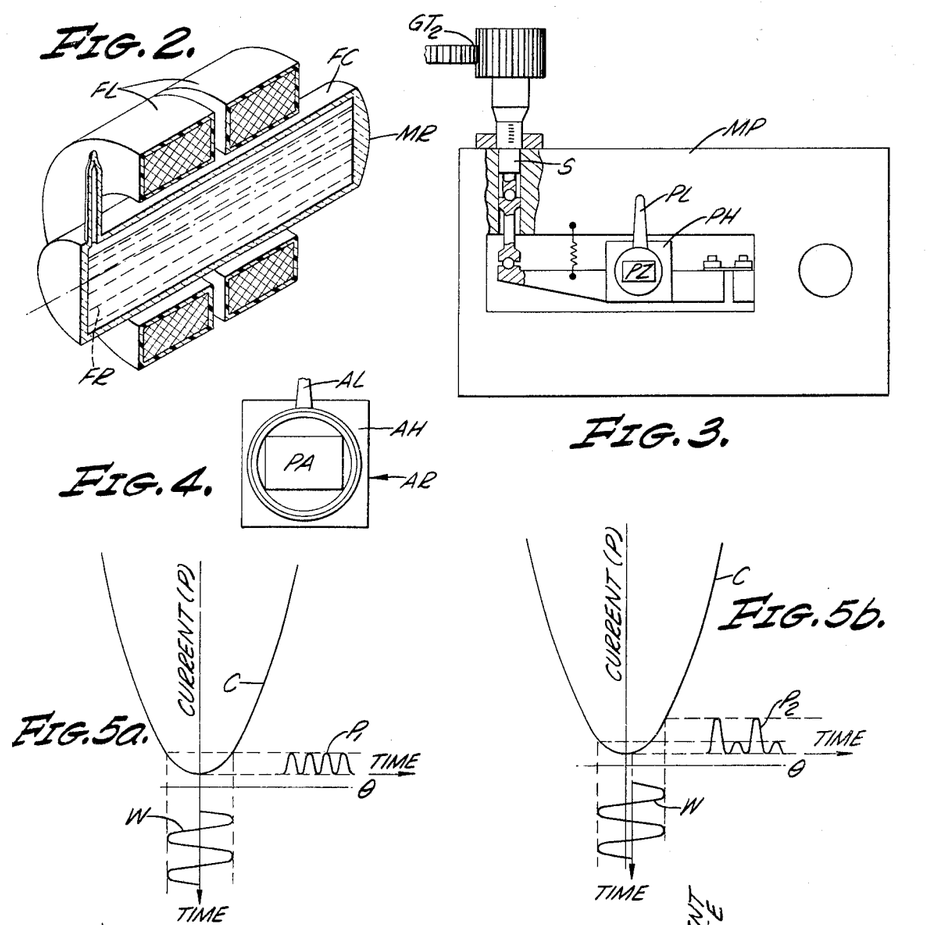
FIG. 2 is a cross-sectional perspective view of a Faraday cell employed in this invention.
FIG. 3 is an elevational view of a polarizer.
FIG. 4 is an elevational view of an analyzer.
FIGS. 5a, 5b, 5c, and 5d are graphs employed in explaining the operation of the correction system of this invention.

Both the polarizer PR and the analyzer AR are rotatably mounted in corresponding housings PH and AH which are mounted upon a common mounting plate BP. Both the polarizer PR and the analyzer AR can be rotated on the respective housings and set in fixed positions in those housings by manipulation of levers PL and AL attached thereto as illustrated in FIGS. 3 and 4. The housing AH in which the analyzer AR is mounted is fixed on the plate BP. However, the housing PH in which the polarizer PR is mounted is pivotally attached by means of a spring on the plate BP, and is rotatable about its pivot through the action of a gear train $GT_2$ that actuates a screw SC engaging the end of the mounting remote from its pivot.

To prepare the polarizer for use, monochromatic radiation is projected into the polarizer unit P from the monochromator without a sample in place and the polarizer PR is set for maximum light transmission of radiation entering it from the monochromator; and the analyzer AR is adjusted in its housing to produce a minimum output. In this operation advantage is taken of the fact that the radiation emitted from the monochromator MC is itself partially polarized by virtue of the action of the dispersing prisms $P_1$ and $P_2$. After the analyzer AR has been set, the polarizer PR is then rotated slightly to set it accurately in such position that the polarized radiation transmitted through the polarizer PR is extinguished by the analyzer AR. In this condition, the plane of polarization of the polarizer PR is parallel to the polarization plane of the radiation emitted from the monochromator, thus attaining most efficient use of the radiation emitted from the monochromator.

Thereafter, when a sample is placed in the sample cell SC, the polarizer housing PH is rotated automatically in response to the output of the photocell PC to rotate the polarizer PR through an angle equal and opposite to the angle through which the sample rotates the polarized beam.

In the specific embodiment of the invention illustrated herein, alternating current of fixed fundamental frequency is supplied to the Faraday coil from a power source PS, thus causing the magnetic field along the axis of the Faraday core FR to reverse alternately, varying in intensity in a sinusoidal manner. When this occurs, the alternating magnetic field causes the plane of polarization of the light that is transmitted from the sample to the reflecting mirror MR and thence to the analyzer AR to be oscillated about the axis of the beam in a similar, almost sinusoidal, manner. As a result, an alternating current is generated in the photocell PC.

It can be shown that, at least for small angles of deviation of the plane of polarization of the beam incident on the analyzer AR, the component of the alternating current generated by the photocell which is of fundamental frequency, has an amplitude that is proportional to the deviation of the polarization plane from the extinction position and a polarity of phase that depends upon the direction of such deviation from the extinction position.

In order to achieve an optimum extinction condition, the walls of both the Faraday cell FC and the sample cell SC through which the polarized beam travels are preferably composed of a material which is free of birefringence. For this reason, in a typical spectropolarimeter, an isotropic substance, such as annealed fused silica glass, is employed in those walls and they are mounted in such a way that they are free of any substantial mechanical strain. Under such conditions, the plane of polarization of the beam that enters the analyzer AR is parallel to the polarization plane of the polarizer PR and is perpendicular to the plane of polarization of the analyzer AR.

Figure 6:
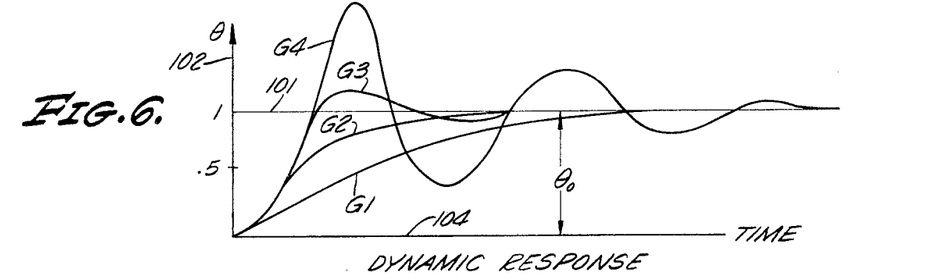
FIG. 6 is a graph of the dynamic response of a spectropolarimeter system as employed in this invention.

In FIG. 6 there is shown a chart of typical dynamic response of a servo-system of the type employed in this invention to rotate the polarizer PR. The chart shows how the angular position of the polarizer varies as a function of time when the plane of polarization of the beam is suddenly rotated by an angle $\theta_0$ from the extinction condition. In this chart the change in rotational angle as a ratio to the correction required, is shown on the ordinate at 102. The time of response is shown on the abscissa at 104. If the loop gain of the servo-system is too large, that is if the amplitude of the AC signal is too large, the change in rotation of the plane of polarization will result in overshooting indicated in graph G4 generating a damped train of oscillatory variation about the ultimate or asymptotic normal position indicated by the line 101. By the application of appropriate correction factors to the system, the oscillation about the position indicated by line 101 can be reduced or eliminated.

Where the gain is too low, an excessive time elapses before the plane of polarization of the beam to the normal condition represented by line 101. During the interval between the initial change and the ultimate state the plane of polarization gradually approaches its ultimate or asymptotic value in the manner represented in the overdamped wave response curve G1 of FIG. 6.

High loop gain corresponds to underdamping and low loop gain corresponds to overdamping.

The response resulting from other degrees of damping are shown by graphs G2 and G3. The graph G3 corresponds to a slightly underdamped condition and graph G2 corresponds to a slightly overdamped condition. A condition of slight oscillation is represented by graph G3 and a condition of no oscillation by graph G2. For many purposes a slight underdamping is considered best since such a condition permits a high degree of compensation to occur rapidly in about minimum time without excessive overshooting.

The corrections system herein disclosed are capable of producing response characteristics like that shown at G2 of FIG. 6 over a wide range of wavelengths.

The gain of the servo-system depends on wavelength partly because of changes in intensity of light striking the analyzer and partly because a change in variation of the Verdet constant of the Faraday core material and for other reasons. Consider for a moment the effective light transmission coefficient $\bar{T}$ of the polarimeter unit.

The average light transmission coefficient of the system can be expressed in terms of the transmission coefficient with the polarized and analyzer in crossed condition, the transmission coefficient when the polarizer and analyzer are in parallel condition, the deviation of the polarizer and analyzer from the crossed condition, and the amplitude of angular oscillation of the polarized beam. The factors are related by the following equation:

$$\bar{T} = T_0 + \frac{T_1 \theta_1^2}{2} + T_1 \theta_0^2$$

where $\bar{T}$ = average light transmission of the system
$T_0$ = light leakage of system with polarizer and analyzer in crossed condition (when $\theta_0 = \theta_1 = 0$)
$T_1$ = light transmission when polarizer and analyzer are parallel (full transmission)
$\theta_0$ = deviation angle of polarizer relative to analyzer measured from crossed condition
$\theta_1$ = peak value of angular oscillation The range of change of light transmission (R.M.S.) due to the modulation can be expressed as $$T\omega = \frac{2T_1}{\sqrt{2}} \theta_1 \theta_0$$

In the photomultiplier detector, the corresponding current components are $\bar{I}$ = average current and $I_\omega$ = R.M.S. signal current The average current $\bar{I}$ is proportional to the transmission $\bar{T}$ and the R.M.S. current $I_\omega$ is proportional to $T_\omega$.

The sensitivity of the detecting system is expressed as $\mu = I\omega\theta_0$ or the ratio of the R.M.S. photomultiplier current to the deviation of the plane of polarization from the extinction condition. Regardless of other effects the gain depends on $\theta_0$, $\theta_1$, and the ratio of $T_0/T_1$ in accordance with the equation $$\mu = \frac{\sqrt{2}\bar{I}\theta_1}{\frac{\theta_1^2}{2} + \theta_0^2 + \frac{T_0}{T_1}}$$

Figure 7:
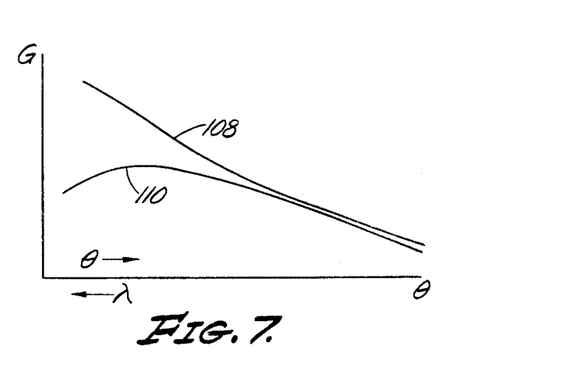
FIG. 7 is a graph showing how the response of part of the spectropolarimeter varies with oscillation angle and wavelength.

When the light leakage $T_0$ is negligible and the average current $\bar{I}$ photomultiplier anode 30 is held constant, the gain of the detecting system $\mu$ as a function of the modulation angle $\theta_1$ follows the curve shown at 108 in FIG. 7. If $T_0$ is as much as a fraction of 1% the gain curve has a considerable different shape as indicated by graph 110 of FIG. 7.

Therefore, if the oscillation angle $\theta_1$ changes with wavelength, the gain $\mu$ will change with wavelength.

For this reason, the compensation of the overall gain of the system is necessary to provide an overall loop gain independent of wavelength. At the same time, compensation must be made to correct for changes in sensitivity of the photocell and the absorption of the sample and the like. Such compensation is produced in part by automatically regulating the gain of the photomultiplier to produce a constant DC output current $\bar{I}$ regardless of the intensity and wavelength of the radiation incident thereon, and in part by varying the amplification in the servo-loop or the AC current in the Faraday coil or both.

When an optically active test substance is in the beam, the plane of polarization of the beam is rotated from the extinction position as it passes through the sample cell SC. The angle of rotation produced by the substance is here called $\theta_0$. In order to restore the extinction condition, the polarizer PR is rotated through an equal and opposite angle $-\theta_0$.

In the spectropolarimeter employing this invention the alternating current developed by the photocell PC is selectively amplified by tuned amplifiers $A_1$, $A_2$ to amplify the AC current component of fundamental frequency. This amplified current is applied to a servo-motor SM which operates through a first gear train $GT_1$ to operate a pen recorder RC and through an additional gear train $GT_2$ to operate the polarizer PL in such a way as to restore the plane of polarization incident upon the analyzer AR to its extinction position.

Figure 5C:
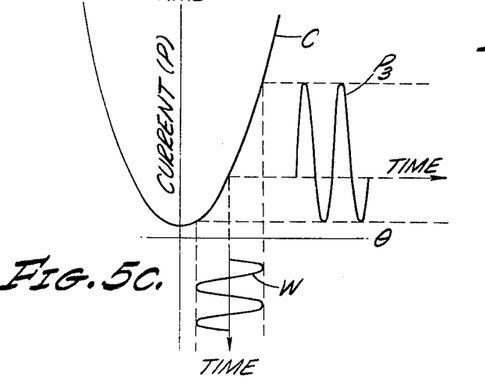

The manner in which the current generated by the photocell PC varies for different average angles $\theta_0$, may be explained readily by reference to the graphs in FIGS. 5a, 5b and 5c. In the upper half of all three of these graphs, a curve C, which is of approximately parabolic shape, represents the manner in which the current output of the photomultiplier tube PC varies as a function of the angle $\theta$ that the plane of polarization of the beam impinging on the analyzer AR deviates from the extinction position, so long as the angle $\theta$ is small. In these graphs it will be noted that even when the angle $\theta$ is zero, some current is produced by the photomultiplier tube PC and that as the angle $\theta$ increases, the current also increases but as the square of the deviation $\theta$.

In the lower part of each of the graphs 5a, 5b and 5c, a curve W is shown that represents the manner in which the angle $\theta$ varies as a function of time. In graph 5a it is assumed that the average deviation $\theta_0$ of the beam from the extinction position is equal to zero. In FIG. 5b it is assumed that the average deviation is less than the amplitude of the alternating component of the deviation, while in FIG. 5c it is assumed that the average is greater than the amplitude of the alternating component of the deviation. In all three cases represented in FIGS. 5a, 5b and 5c, the amplitude of the current generated by the photomultiplier tube PC in response to the beam of light impinging thereon, is unidirectional but fluctuates with the alternating current components superimposed upon a DC component. In the case of FIG. 5a, which corresponds to an extinction condition the AC component of the photomultiplier current $P_1$ consists substantially entirely of a second harmonic, or 120 c.p.s. component. In the case of FIG. 5b, which corresponds to a deviation from the extinction condition, the AC component of the photomultiplier current $P_2$ consists of a fundamental AC component of 60 c.p.s. superimposed on a second harmonic AC component of 120 c.p.s. In the case of FIG. 5c, which corresponds to wide deviation from the extinction condition, the AC component of the photomultiplier current $P_3$ consists primarily of a 60 c.p.s. component and odd harmonics thereof in addition to the 120 c.p.s. component and other even harmonics.

Figure 5D:
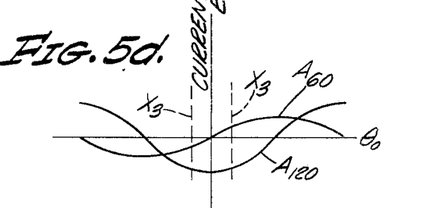

The manner in which the amplitude of the fundamental and the second-harmonic components vary with the average angle of rotation is indicated in the graph of FIG. 5d. There it will be noted that the amplitude of the 60 cycle component $A_{60}$ is proportional to the average angle or rotation $\theta_0$ for small values of $\theta_0$. In fact, the sign or polarity or phase of this current is reversed as $\theta_0$ changes from positive to negative. In this graph the curve $A_{120}$ illustrates how the magnitude of the 120 c.p.s. AC component of the current changes. This curve, it will be noted, is nearly flat so long as $\theta_0$ is small.

In the practice of this invention under the most important conditions, $\theta_0$ is very small and the amplitude of oscillation of the angle of rotation is made only a degree or so. Under such conditions, $$A_{60} \ll A_{120}$$

that is, the amplitude of the 60 c.p.s. component is very small compared to the amplitude of the 120 c.p.s. component of the alternating current part of the current generated by the photomultiplier tube 24. Also, under this condition, $$\theta_0 \ll \theta_1$$

In this invention, the light-intensity responsive system involving photomultiplier PC, amplifier $A_1$ and $A_2$ is made selectively responsive to the 60 c.p.s. component and selectively non-responsive to the 120 c.p.s. component and DC component. With such a light-intensity responsive system, the null or extinction point may be accurately detected. This invention makes it possible to attain the null or extinction condition at a substantially uniform speed throughout the entire spectral range of the spectropolarimeter without overshooting and without sluggishness. This is done by controlling the effective damping, which is accomplished by controlling the loop gain of the servo-system and more particularly by controlling the system in such a way that for a fixed deviation $\theta_0$ the amplitude of the AC current applied to the servo-motor SM is substantially constant throughout the entire spectral range of the spectropolarimeter.

In the spectropolarimeter to which this invention is applied, the wavelength of the radiation emitted from the monochromator MC is varied automatically during an analysis of a specimen by operation of the scanning motor CA. Also as the wavelength is varied the light grasp of the monochromator is varied as a predetermined function of the wavelength by operation of an automatic slit width controller SW. According to this invention, a characteristic of an element that controls the loop gain of the servo-loop is varied to maintain the open-loop gain nearly constant and at a value suitable for producing rapid stable operation throughout the entire range of wavelengths of the instrument.

In the monochromator MC the entrance slit SN and the exit slit SX are each defined by a pair of slit jaws JN1, JN2 and JX1 and JX2. The two jaws JN1 and JX1 on one side of each of the slits SN and SX respectively, are formed by parallel edges of a common plate JP1. Similarly, the two jaws JN2 and JX2 on one side of each of the slits SN and SX respectively, are formed by parallel edges of a common plate JP2. Means including a cam CM engaging parallel follower elements FE1 and FE2 on the respective plates JP1 and JP2 are employed for adjusting the slit widths. The spacing of the pair of jaws JN1 and JX1 on the plate JP1 is equal to the spacing between the jaws JN2 and JX2 of the plate JP2 so that the two slits SN and SX always have the same widths. A slit width adjusting mechanism of this type is described and claimed in Pat. No. 3,098,408 that issued to Henry H. Cary on July 23, 1963.

In accordance with the slit width control mechanism disclosed in my copending patent application Ser. No. 348,347 filed on Mar. 2, 1964, the cam CM is coupled to the scanning motor CA in such a way that the widths of the slits SN and SX can be varied synchronously during the scanning in accordance with a predetermined and reproducible function of the wavelength of the radiation emitted from the monochromator MC. In the monochromator illustrated in FIG. 1 the cam CM is operated by automatic slit width controller SW. The widths of the slits SN and SX are set at the same predetermined value at each respective wavelength in successive scans of the spectrum.

In operation, the scanning motor CA rotates the prisms $P_1$ and $P_2$ to cause the wavelength of the radiation emitted from the exit slit SX to vary. A slit width indicator WI is connected to the output shaft SS of the slit width controller SW. A wavelength indicator $\lambda I$ is also coupled to the shaft of the scanning motor CA. With this arrangement, the scanning motor may be operated as by manipulation of a switch (not shown) to set the monochromator at a succession of wavelengths indicated by the wavelength indicator $\lambda I$ one at a time. The manner in which the slit width adjustments are set to produce uniform dispersion throughout the spectrum or to set the intensity of the monochromatic radiation at values desired at various parts of the spectrum, are described in more detail in my aforesaid copending patent application Ser. No. 348,347.

A control unit CU is provided to produce a recording of the measurements from one wavelength to another and from one specimen to another. The control unit CU includes a deflection signal sub-unit DF, and a balancing sub-unit BL. The balancing sub-unit BL makes it possible to shift the zero level to facilitate recording on an enlarged scale the significant data of a spectropolarogram. The balancing sub-unit BL also makes it possible to record different spectropolarograms, and even different parts of the same polarogram to different scales.

SPECIFIC DESCRIPTION

As is apparent from FIG. 7, the gain of the system and hence, the compensation necessary to correct for variations in gain, depends not only on how the Verdet constant varies with wavelength, but also on the light leakage, that is, the amount of light that is transmitted through the analyzer in the crossed condition. However, for the purpose of this invention, exact compensation throughout the entire spectral range of the spectrophotometer is not required.

Three different systems for attaining excellent compensation throughout a wide range of wavelengths are specifically illustrated herein. Two involve variation of the gain of the light detecting and amplifying system as a function of wavelength during the scanning of the spectrum. The third involves the variation of the amplitude of modulation produced by the Faraday cell as a function of wavelength during the scanning of the spectrum.

In the system of FIG. 1, the electrical amplification is varied as a function of wavelength during the scanning of the spectrum. As previously explained, in the system of FIG. 1, monochromatic radiation is transmitted along the optical axis X—X through the polarizer PR, sample cell SC, Faraday cell FC, analyzer AR, and on to the photocathode 10 of photomultiplier light detector PC. Photomultiplier detector PC is supplied by a potential from a DC power source 12 with the negative terminal 14 connected through a resistor 15 to cathode 10 of detector PC and the positive terminal 16 connected through a regulator amplifier 18 to ground at 20. The anode 17 of regulator tube 18 is connected to the positive terminal 16 of DC power source 12. The cathode 19 of regulator 18 is connected to ground. Though detector PC may have ten secondary emission dynodes, only a few are shown, the detector being shown herein with a portion broken away for convenience of illustration.

A voltage divider resistor 25 that is connected across the regulator output of DC power source 12 has taps connected to the secondary emitter dynodes 26 so as to provide appropriate incremental accelerating potentials to the respective dynodes 26. An output load resistor 28 is connected between ground and the collector electrode 30 of photomultiplier detector PC. It is to be noted here that ground 20 is at a positive polarity with respect to the cathode 10 of photomuliplier detector PC. The collector or final anode 30 of detector PC is coupled to a first amplifier A₁. An attenuator shown schematically at 34 is connected between the output 35 of amplifier A₁ and the input 37 of a second amplifier A₂. Attenuator 34 is employed to vary the combined gain of the amplifiers A₁ and A₂. The gain may be controlled in other ways.

Figure 8:
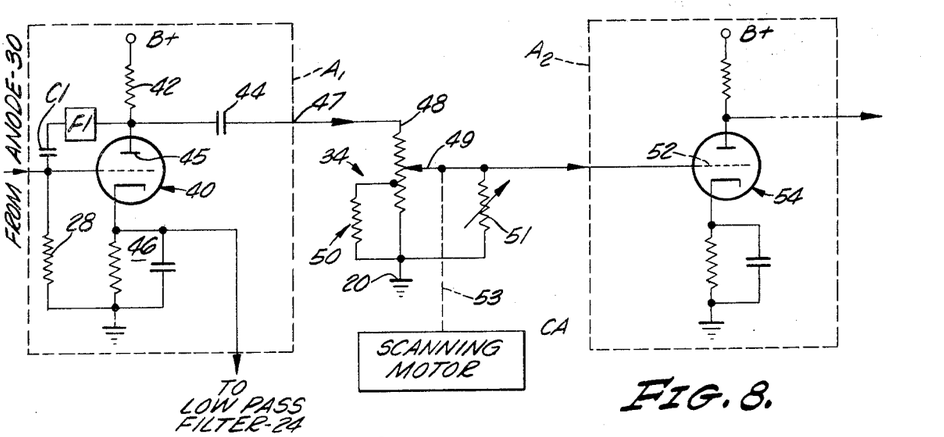
FIG. 8 is a schematic circuit diagram of a detail in the embodiment shown in FIG. 1.

A further detailed circuit diagram of the coupling between amplifiers A₁ and A₂ is shown in FIG. 8.

A representative amplifier is shown by the dashed block A₁ of FIG. 8, coupled to collector 30 of photomultiplied detector PC, previously mentioned. Resistor 28 is the load resistor for collector 30 and also the grid leak for amplifier triode 40. Resistor 42 is an anode load resistor for triode 40. The RC network 46 provides cathode biasing means for triode 40 and also DC feedback means for regulating the dynode voltage. A notch filter F1 and capacitor C1 is employed to render the negative feedback a minimum at 60 c.p.s. and at DC. As a result, the amplifier is selectively responsive to provide amplified signals of 60 c.p.s. at the output 47. At the same time the DC signal appears across the cathode circuit due to the cathode follower action.

The anode 45 of triode 40 is coupled by capacitor 44 to one end 48 of attenuator 34. The slidewire arm 49 of attenuator 34 is connected electrically to the grid 52 of an input triode in a second amplifier (A₂) shown at 54 and mechanically, as shown by link 53 to scanning motor CA.

A tapped resistance section 50 is provided at the low resistance end near ground 20, of attenuator 34. An adjustable resistor 51 is connected between slider 49 and ground. The position of resistor 50 on attenuator 34 is selected to operate with resistor 51 (effectively between grid 52 of the triode 54 and ground 20) so that the resulting parallel and series parallel resistance combinations which prevail at different positions of arm 49 on attenuator 34 provide an appropriate attenuation curve in relation to the wavelength scanning positions of scanning motor CA whereby a substantially narrower range of variation in output from amplifier A₂ will be observed as the wavelength of the polarized light beam is varied.

Referring back to FIG. 1, a low-pass filter 24 is connected from a second output 58 of amplifier A₁ to the grid 56 of regulator triode 18. Low-pass filter 24 provides a signal to the grid 56 of triode 18. This signal is substantially a slowly varying DC level, since all of the AC components of the Faraday cell modulating signal and their harmonics are highly attenuated by low-pass filter 24. This filter has a cutoff frequency of about 10 c.p.s.

Thus, any change in the reference level of the DC component of the signal applied to amplifier chains A₁ and A₂ from photomultiplier detector PC will be corrected for by the voltage regulator 18 for power supply 12. As a result, the AC gain of the photocell and the amplifier A₁ are automatically regulated to maintain nearly constant the ratio of the AC signal at the output 47 to the percentage variation in intensity of a light beam striking the photocathode. But as pointed out above, this percentage variation changes with Verdet constant and hence with wavelength. The attenuation produced by the attenuator is varied in a compensating manner to provide a signal at the output of amplifier A₂ which is substantially constant for given deviation of the plane of polarization of the beam from the extinction position.

Figure 9:
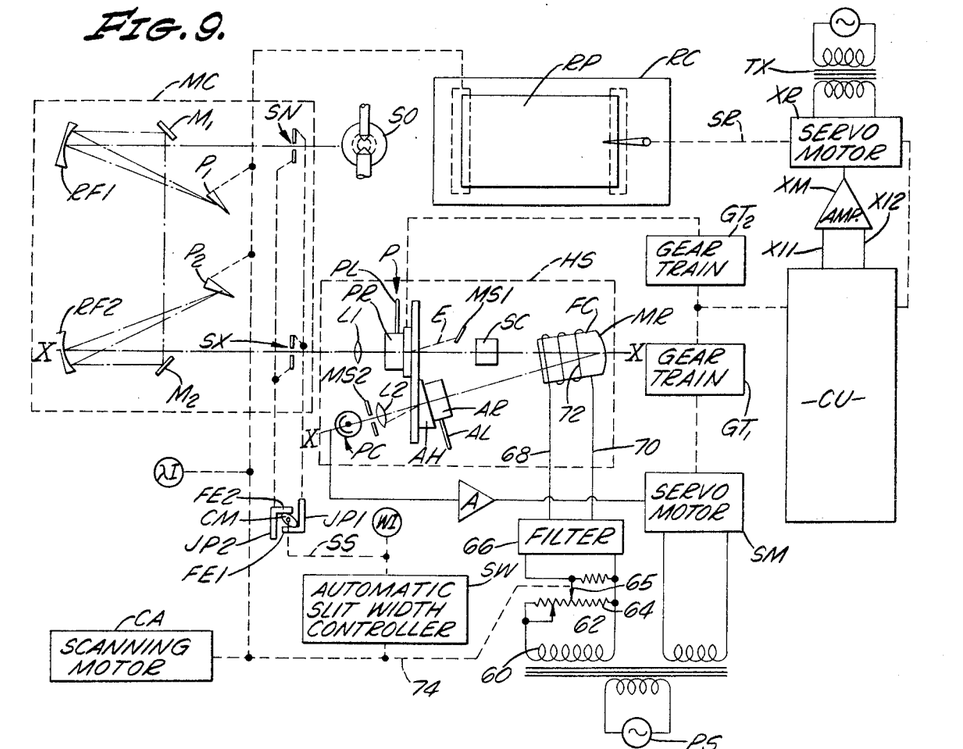
FIG. 9 is a schematic diagram of a spectropolarimeter including another embodiment of this invention.

In another embodiment of this invention shown in FIG. 9, a means is illustrated whereby compensation may be made for the variation of the Verdet constant of the core of the Faraday cell FC as a function of the wavelength so that the amplitude of the angle of rotation of the beam may be maintained constant irrespective of wavelength.

One of the secondary windings 60 of transformer PS supplies a 60 cycle AC voltage to winding 72 of Faraday cell FC through the arms of attenuators 62, 64, filter 66 and leads 68 and 70. The arm of attenuator 62 can be preset to establish the output level of winding 60. The arm 65 of attenuator 64 in addition to the electrical connection thereof to filter 66 is also mechanically coupled, as shown by link 74, to scanning motor CA so that the position of arm 64 is a function of the wavelength settings of prisms P₁, P₂ and slits SX and SN.

Figure 10:
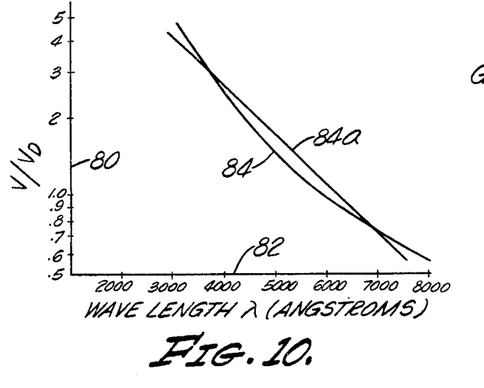
FIG. 10 is a graph showing how the typical Verdet constant of water varies as a function of wavelength.

A semilogarithmic graph showing the variation of the Verdet constant of water as a function of wavelength is presented in FIG. 10. The logarithmic ordinate scale 80 is calibrated to represent the ratio $V/V_d$ the ratio of Verdet constant normalized above the value for the D-line of sodium. Wavelengths are shown as abscissa 82 on a linear scale from 2000 A. through 8000 A.

As indicated in FIG. 10 the Verdet constant ratio varies 10-fold from 0.5 to 5 over the range from 3000–8000 A. Over the wavelength range in question, the Verdet constant is almost an exponential function of wavelength. More accurately, it is hyperbolic and is of the form $$V = \frac{K}{\lambda^2 - \lambda_0^2}$$

where K and $\lambda_0$ are constants of the core material. However, in the range of wavelengths $\lambda$ that are high compared with $\lambda_0$, for many purposes it may be treated as exponential as indicated by the straight line 84a on the graph. Since the amplitude of oscillation of the plane of polarization of the beam transmitted through a Faraday cell for a constant AC current, an exponential or hyperbolic correction of the current is introduced to produced a relatively constant rotation of the plane of polarization over the range of wavelengths of the beam of light in the path X—X. In this embodiment of the invention, when the Verdet constant decreases as the wavelength is changed, the amplitude of the AC current is increased to counteract the change in Verdet constant. And when the Verdet constant increases as the wavelength is changed, the amplitude of the AC current is decreased to counteract the change in Verdet constant.

Accordingly, by suitable design of the attenuator 64, the attenuation introduced by the attenuator (FIG. 9) as the arm 65 is moved thereacross is such that, when the scanning motor CA varies the wavelength of the monochromatic radiation projected through the polarizer unit P, the resulting amplitude of oscillation of the rotation of the plane of polarization is maintained nearly constant.

Figure 11:
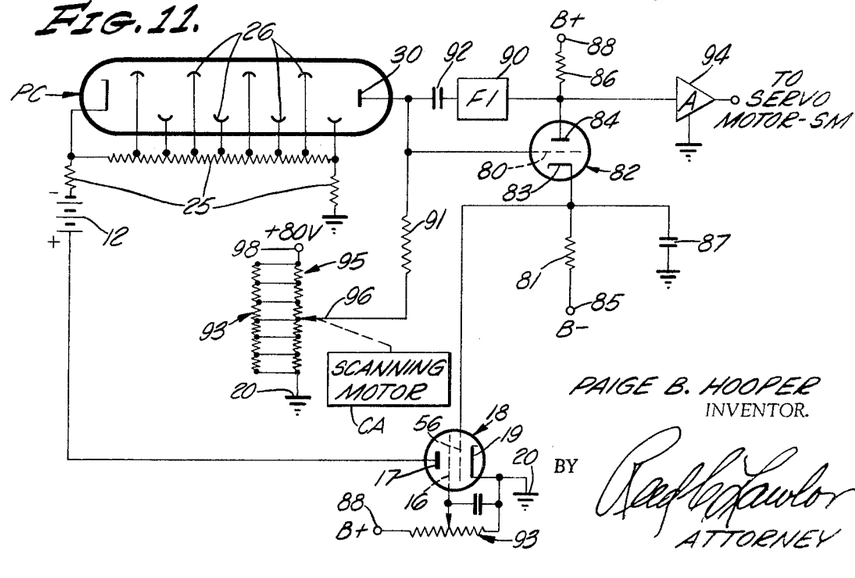
FIG. 11 is a schematic circuit diagram of a detail of a further embodiment of the invention.

In another embodiment of the invention shown in the schematic diagram on FIG. 11, the gain of the photomultiplier PC is varied as a function of wavelength by varying the voltage supplied to the anode 30 and the gain is automatically regulated by means of a regulated power supply.

In the regulated high voltage DC supply of FIG. 11, the regulator tube 18 is in series with the positive end of supply 12. The anode 17 of the regulator tube 18 is connected to the positive terminal of the DC power source 12 and the cathode 19 thereof is connected to ground. The screen grid 16 of regulator tube 18 is supplied with a positive potential with respect to ground through a voltage divider network 93.

The anode 30 of the photomultiplier detector PC is directly coupled to the grid of an amplifier tube 82. The grid 80 of amplifier tube 82 is maintained negative relative to the cathod 83 by virtue of the current that flows through the resistor 91 to the anode 30 of the photomultiplier tube. The anode 84 of amplifier tube 82 has an anode load resistor 86 connected to a source of positive potential 88. Anode 4 is also connected to a 60-c.p.s. amplifier 94. The cathode 83 of amplifier tube 82 is connected through a resistor 81 to a source of negative potential at 85 and directly to grid 56 of regulator 18. The grid 56 is thus provided with a proper negative bias relative to the cathode 19. A bypass capacitor 87 shunts cathode resistor 81 to bypass 60 c.p.s. signals.

Anode 30 of photomultiplier PC and grid 80 of amplifier 82 return through a resistor 91 and the bias potentiometer 95 to ground. Bias potentiometer 95 is tapped at predetermined intervals and each tap is connected to a corresponding tap of a voltage divider resistor 93. The taps of voltage divider resistor 93 and potentiometer 95 are set to provide a predetermined parallel resistance across each pair of adjacent taps of potentiometer 95. In this way, the voltage at the slider 96 may be varied by the scanning motor CA as a predetermined function of the wavelength.

The actual function desired depends in part on how the Verdet constant of the Faraday core varies with wavelength and partly on the amount of light leakage of the polarimeter in the crossed position. The setting of the slider 96 determines the gain as regulated by the amplifier tube 82 and the regulator 18.

A notch, or narrow band-pass, filter 90 is coupled through a capacitor 92 between anode 84 and grid 80 of amplifier 82. The notch filter 90 selectively attenuates signals at 60 c.p.s. Hence, so far as the action of this filter is concerned, signals of all frequencies other than 60 c.p.s. are passed through the filter without appreciable attenuation from the output of the amplifier 82 to its input, that is, from anode 84 to grid 80 thereof. As a result, there is no negative feedback at 60 c.p.s. The impedance of capacitor 92 provides greater transfer of the output of filter 90 at higher frequencies than at lower frequencies, so that except near 60 c.p.s., greater negative feedback occurs at high frequencies.

Because of the action of the filter 90, the amplifier tube 82 is responsive to signals below a few cycles per second so that slowly varying DC signals appear across cathode resistor 81 to produce the desired regulation of the photomultiplier current. In addition, the amplifier 82 is sharply responsive at 60 c.p.s. thus providing an amplified AC signal to the servomotor that operates the polarizer PR. By varying the level of the photomultiplier current, as a function of wavelength by operation of the scanning motor CA, the amplitude of the AC current applied to the servomotor is maintained nearly constant and at a value at which rapid response without overshooting is obtained.

The voltage supplied from power supply 12 to the dynodes 26 is a function of the bias voltage appearing on grid 56 of regulator tube 18. Due to the connection of cathode 83 of amplifier tube 82 to grid 56 of regulator tube 18, the bias on grid 56 is a function of the variation in voltage drop across resistor 81. The voltage drop across resistor 81 is due to two factors: the voltage drop across resistor 91 due to the current drawn by anode 30 in response to the light intensity variations of the beam of light incident on cathode 10 of photomultiplier PC and the bias voltage setting of arm 96 of attenuator 95 as a function of the wavelength of the incident beam. The DC anode current of amplifier 82 through cathode resistor 81 varies as the position of arm 96 is varied and as the current drain of anode 30 through resistor 91 varies.

It should be noted here that, in practice, the value of resistor 91 is of the order of 100 megohms or more so that even very small variations in current drawn by anode 30 therethrough result in a relatively substantial voltage drop.

The variations in current drawn by anode 30 is also a function of the supply voltage applied to photomultiplier PC from power source 12. Thus, the bias applied to grid 56 of regulator tube 18 affects the voltage applied to photomultiplier PC.

In the system shown in FIG. 11, the polarized monochromatic light beam incident upon the cathode 10 of photomultiplier detector PC in the normal operation of a spectropolarimeter is at the minimal output intensity to be anticipated in the crossed conditions of polarizer PR and analyzer AR. This light beam is modulated at 60 c.p.s. by alternate positive and negative rotations of the plane of polarization of the beam passing through Faraday cell FC in response to the 60 c.p.s. modulating current applied to Faraday cell through filter 66 as shown in FIG. 1, from power supply PS. While the deviation of the plane of polarization of the light beam from the crossed position is small, the amplitude of the 60 c.p.s. component of the modulation is proportional to the deviation.

The low intensity modulated light beam thus incident upon cathode 10 of photomultiplier PC results in a 60 c.p.s. output current at the anode 30 thereof which is applied to grid 80 of amplifier tube 82.

As has been previously described, the magnitude of the rotatory action of Faraday cell FC upon the polarized beam in the absence of a sample in the beam depends on the Verdet constant of the material of the core of the cell. The Verdet constant results in a variation in the AC component in the manner indicated in FIG. 10 over a wide range of wavelengths of the light incident upon the Faraday cell.

In one form of this embodiment of the invention, the tapped bias adjustment of potentiometer 95 and shunting resistor network 93 is arranged to vary the gain of the photomultiplier tube PC as an inverse function of the wavelength. In one form of the invention, the scanning motor caused the monochromator to scan the spectrum from the long wavelength end thereof to the short wavelength end. In such a case, the gain of the photomultiplier tube PC starts at its lowest value while the wavelength is long. Then, as arm 96 of potentiometer 95 is brought closer to the positive bias end 98 of the network 95, 93 corresponding to the short wavelength end of the spectrum, increased positive voltage raises the effective amplification of photomultiplier tube PC. As this occurs, the ratio of the AC current applied to the servomotor SM for a given deviation of the beam from its crossed position, is maintained substantially constant.

The invention has been described only with reference to the measurement of natural optical activity of materials. In other words, in the description of the invention above, attention has been given to the rotation of the plane of polarization produced by a sample in a sample cell that has not been subjected to either an electric or magnetic field. The polarization rotation properties of a sample subjected to a magnetic or electric field could also be determined with the spectropolarimeter The polarization of light transmitted through or reflected from a sample under investigation may be altered because of optical dissymmetry of molecules and crystals in a material. Examples of such optical dissymmetry effects are described below.

In any event, as plane polarized light from the polarizer is transmitted through a test specimen, or sample, the polarization of the light incident on the sample cell or other optical elements in the light path can be affected in many ways depending upon the properties of the material thereof. Some materials exhibit optical activity, the property of a material that rotates the plane of polarization of radiation transmitted therethrough as in the examples described above. All materials have magneto-optic properties. Such properties cause rotation of the plane of polarization in proportion to the intensity of a magnetic field applied to the specimen, the sample cell, or other optic elements along the path of the radiation. This is known as the Faraday effect. All materials likewise exhibit a Cotton-Mouton effect. In this effect a magnetic field component transverse to the path of the radiation induces birefringence on the material, that is the velocity of propagation of plane polarized light is different depending on whether the polarization plane is parallel to or perpendicular to the component of a magnetic field that is normal to the light path. Some materials exhibit natural birefringence. Such materials cause the plane of polarization of a beam of radiation entering the material to be emitted from the material as an elliptically polarized beam. The degree of ellipticity can vary from 0 to 1 depending upon the length and the orientation of the plane of polarization of the optical path in the specimen. Materials also exhibit a Kerr effect. These materials exhibit birefringence when an electrostatic field is applied to the material in a direction perpendicular to the optic axis.

Some other materials exhibit dichroism. In the dichroic effect, a plane polarized beam entering the material emerges as an elliptically polarized beam even though no magnetic or electric field is applied thereto.

In all of these cases a polarimeter responds to the effects that the materials have on polarized light. Information regarding such response is useful in the investigation of the properties and compositions of materials under investigation. If these effects are produced by optical elements present in the monochromatic polarized beam irrespective of a sample, they can be a source of inaccuracy in the analysis of samples placed in the beam.

The Faraday effect, the Cotton-Mouton effect and the Kerr effect all vary as a function of the wavelength of the radiation being transmitted along the path in which a specimen is being analyzed so that the rotation of the plane of polarization due to these effects will be different for each monochromatic polarized beam of radiation in the light path.

Since many materials exhibit the various effects above named, it follows that the materials in the light path other than the specimens to be analyzed in a spectropolarimeter according to this invention can exhibit optical activity and rotate the plane of polarization of a beam of polarized light transmitted therethrough to an extent such that a greater or smaller rotation angle would be attributed to the sample than the true rotation angle.

Thus, where such materials are in the light path and when the material exhibiting such optical activity rotates the plane of polarization to a greater or lesser degree at different wavelengths, a detector in the light path will develop different output signal levels at different wavelengths of the beam in the absence of a sample or specimen in the beam.

In the spectropolarimeter of this invention, measurements are made that depend upon the detection of the deviation of a mean plane of polarization of a beam of light from the polarization plane of an analyzer and use is made of this deviation to compensate for any deviation from the crossed position caused by a change in wavelength of the monochromatic beam of light being transmitted through the sample. It is not necessary that the plane of polarization of the beam be pure. In this connection, it is to be borne in mind that with an elliptically polarized beam which is not circularly polarized, the elliptical polarization may be considered as a vector sum of a circularly polarized beam and a plane polarized beam traveling along the same path. The analyzer is insensitive to any changes in the circularly polarized component and responds only to a change in orientation of the plane polarized component. It is sufficient if the polarized beam has a distinct plane of polarization which can be detected. Thus, where reference is made in the claims to a plane of polarization, it is intended to refer to that plane of polarization which is capable of being detected by an analyzer. Accordingly, it will be understood that while the invention has been described above only in connection with the use of polarized light that is substantially free of circular polarization, the invention is also applicable to making measurements on beams which are elliptically polarized.

In this invention, the deviation of the mean plane of polarization of the beam striking the analyzer from the polarization plane of the analyzer is detected and an alternating current signal that increases in amplitude with that deviation is employed to control a servo mechanism to rotate the polarizer in such a direction as to reduce and counteract the deviation caused by the change in wavelength of light transmitted through the sample. In this invention, the signal for controlling the servo mechanism is an alternating current signal that is generated in a photomultiplier tube as a result of the action of an alternating magnetic field on the Faraday cell. This alternating current signal varies in amplitude in proportion to the amplitude of the AC current applied to the Faraday coil, the magnitude of the Verdet constant of the material in the core of the Faraday cell, and is also proportional to the sine of the deviation angle. Additionally, the AC signal generated by the photomultiplier tube depends upon the intensity of the light beams striking the analyzer and the spectral sensitivity of the cathode of the photomultiplier tube. In the best embodiment of the invention, the corrections for light-beam intensity and spectral sensitivity are corrected automatically by means of an automatic voltage regulator that varies the gain of the photomultiplier tube in a compensating manner. Even when compensation for variations in intensity of the light beam and variations in photosensitivity of the cell are corrected, a change in amplitude of the AC current can still arise because of the change in Verdet constant of the material in the Faraday coil as the wavelength of radiation supplied by the monochromator is varied. Such variations in effect constitute a variation in the transfer coefficient or gain of the servo loop that includes the polarizer, the Faraday cell, the photomultiplier tube, the amplifiers, the servo motor, and the gear train that connects the servo motor to the polarizer.

The nature of the transfer coefficient or gain can be understood by reference to the following equation:

$$\theta''/\theta' = G(s)$$

This equation represents the response of the system in open-loop condition, that is, it represents the response of the system when the polarizer in the path of the light beam is disengaged from the gear train and the output shaft is connected to a fictitious polarizer of similar mechanical characteristics but not in the light-beam path. In this equation, $\theta'$ = deviation of the plane of polarization of the beam from the extinction position
$\theta''$ = the angle of rotation of the fictitious polarizer
$s = j\omega t = 2\pi f t$
$t$ = time elapsed
$f$ = frequency component of changes in $\theta'$
$G(s)$ = Laplace transform of the open servo loop
The transfer coefficient or loop gain of the servo loop is the absolute value of $G(s)$, that is
$$K = |G(s)|$$

In practice, the Laplace transform varies with the wavelength $\lambda$ of the radiation being transmitted through the spectropolarimeter.

In the particular systems that have been described herein, the transfer coefficient $K(\lambda)$ varies with wavelength, according to many factors as indicated by the following equation:

$$K(\lambda) = CV(\lambda)I_{ac}K_p(\lambda)K_A$$

where $V(\lambda)$ = Verdet constant of the Faraday core at the wavelength of the monochromatic light beam transmitted through the spectropolarimeter.
$I_{ac}$ = amplitude of the AC current in the Faraday coil.
$K_p(\lambda)$ = amplification of the photomultiplier tube at the wavelength $\lambda$.

$K_A$ = amplification of the amplifier system following the photomultiplier tube.

C = a numerical constant depending upon the characteristics of the servo motor, the gear train, and other elements in the servo loop.

When the output shaft is connected to the polarizer in such a way that when a deviation angle $\theta'$ is produced from the extinction condition, the polarizer is rotated to oppose the deviation and thus restore the extinction condition, the angular position $\theta''$ becomes identical with that of the polarizer and the equation relating the position of the polarizer to the deviation produced at any time becomes $$\frac{\theta_0}{\theta_1} = \frac{K(\lambda)G_0(s)}{1+K(\lambda)G_0(s)}$$

where $$G_0(s) = \frac{G(s)}{|G(s)|}$$

In practice, the manner in which $\theta''$ varies as a function of time, when $\theta_1$ is suddenly changed by a predetermined small amount, is represented by the graphs in FIG. 6. In the absence of some arrangement to control the transfer coefficient $K(\lambda)$ to prevent uncontrolled variations therein as a function of the wavelength, the shape of the response curve changes profoundly as the wavelength changes. For example, if the transfer coefficient of the system is set at such a value that the response is that represented by a graph G2 as shown in FIG. 6, then if the transfer coefficient increases suddenly due to a change in Verdet constant V, the AC current developed in the servo loop may become so large as to cause the polarizer to overshoot producing a damped oscillation as indicated by graph G4. On the other hand, if the transfer coefficient decreases suddenly due to a change in the Verdet constant V, the polarizer may respond very sluggishly as indicated by graph G1. In fact, in the absence of this invention, the adverse effects of such changes in Verdet constant can be much more etxensive than indicated in these graphs.

According to this invention, the transfer coefficient of the servo loop is varied as a function of wavelength to maintain the open-loop gain of the servo loop substantially constant in order to stabilize the operation of the spectropolarimeter and thus avoid such overshooting and sluggishness throughout a wide range of wavelength.

Broadly speaking, whenever the magnitude of the transfer function, that is, the transfer coefficient, tends to change when the wavelength of the monochromatic radiation is changed, the valve of a characteristic of one of the elements in the servo loop is modified to oppose the change in the magnitude of the transfer function. In the system of FIG. 1 the attenuation introduced by the attenuator 34 is changed to vary the gain of the composite amplifier 35, 37. In the embodiment of the invention illustrated in FIG. 9, the amplitude of the alternating current applied to the Faraday coil FC is varied. In the embodiment of the invention illustrated in FIG. 11, the amplification factor of the photomultiplier PC is varied. The changes in gain and the changes in amplitude of the alternating current are both produced by the scanning motor CA that varies the wavelength of the monochromatic radiation projected from the monochromator MC into the polarimeter P. In any event, by means of this invention, the spectropolarimeter automatically maintains the plane of polarization of the beam in a crossed position relative to the plane of polarization of the analyzer AR as the wavelength of radiation transmitted through the sample in the polarimeter is changed. The angle of rotation introduced by the polarizer PR to maintain such crossed relation is recorded automatically as a graph on a record strip RP which therefore represents the manner in which the optical rotation of the sample varies as a function of wavelength.

The radiation that emerges from a polarizer or analyzer is polarized in a polarization plane that is transverse to the optical path. This is the plane that includes the electric vector of the radiation. The same unit that is used as a polarizer can also be used as an analyzer. Accordingly, it will be understood that when reference is made to the properties of a polarizer per se, independently from its use in a spectropolarimeter, an analyzer is to be considered as having the same properties.

It will be understood that this invention may be applied to the measurement of other optical properties of specimens in which a plane of polarization is rotated by differing amounts as the wavelength of the radiation is changed. While the invention has been described particularly with reference to optical activity, it may be employed in the measurement of other effects such as the Faraday effect, the Kerr effect, the Cotton-Mouton effect, and other optical polarization properties of matter. Furthermore, while the invention has been described in connection with the effects of specimens on light transmitted therethrough, it will also be understood that it may be applied to variations in rotation of polarized light, that is reflected or refracted by a sample. Accordingly, it will be understood that the invention may be embodied in many other forms and applied in many other ways within the scope of the appended claims.

The invention claimed is:

1. In a self-balancing spectropolarimeter of the extinction type wherein a beam of monochromatic light developed by a monochromator and characterized by a plane of polarization, is transmitted to a sample and through a Faraday core and then to an analyzer, the improvement which comprises:

means for causing the plane of polarization to rotate by an alternating amount as the beam is transmitted through said Faraday core, the plane of polarization of said beam oscillating angularly about a mean position by an amplitude that varies with the wavelength of the monochromatic beam in accordance with the Verdet constant of material of said Faraday core;

amplifier means including a photomultiplier tube for receiving light transmitted through said analyzer and responsive to said received light for developing an alternating current that varies in amplitude with the amplitude of the oscillation of said polarization plane of said beam and with the gain of said amplifier means and with the deviation of said mean position from the crossed position of said plane of polarization relative to the polarization plane of said analyzer;

rotation control means controlled by said alternating current for rotating the mean position of the plane of polarization of the beam relative to the polarization plane of said analyzer to produce a crossed condition of said beam and said analyzer whereby deviations of said mean plane from the crossed condition are counteracted;

said rotation control means forming with said rotation causing means and said amplifier means a servo loop having a transfer coefficient that varies with the oscillation amplitude of said plane of polarization of said beam and also varies with the gain of said amplifier means; and scanning control means connected to said monochromator to vary the wavelength of the monochromatic light and also operating on an element in said servo loop to counteract a change in said transfer coefficient caused by a change in Verdet constant of the material in said core as said wavelength is changed, whereby the transfer coefficient of said servo loop is stabilized over an extended range of wavelengths.

2. A spectropolarimeter as defined in claim 1 comprising:

means controlled by said scanning control means for counteracting a change in amplitude of angular oscillation of said plane of polarization otherwise caused by a change in Verdet constant of the material in said core as the wavelength of the monochromatic light is changed by said scanning means.

3. A spectropolarimeter as defined in claim 1 comprising:
attenuation means incorporated in said amplifier means for varying the amplification of said alternating current, said attenuation means including a variable impedance element; and
said scanning control means comprising adjustment means interconnecting said monochromator and said variable impedance element for adjusting said attenuation means as a function of the wavelength of the monochromatic light beam developed by said monochromator whereby the amplification of said alternating output current by said amplifier means is varied inversely as a function of the Verdet constant of said material.

4. A spectropolarimeter as defined in claim 1 comprising:
a power supply including means connected to the dynodes of said photomulitiplier tube for establishing the amplification factor of said tube; and
means controlled in accordance with the average magnitude of the current flowing to the anode of said photomultiplier tube for regulating the voltage supplied to said dynodes to vary the gain of said photomultiplier tube as an inverse function of said average magnitude.

5. A spectropolarimeter as defined in claim 4 comprising:
variable voltage supply means including an adjustable potential divider for varying the voltage of said anode; and
said scanning means comprising adjustment means interconnecting said monochromator and said potential divider for varying the anode potential as a function of wavelength of the monochromatic light beam developed by said monochromator whereby the amplification factor of said photomultiplier tube is varied as a function of the Verdet constant of said material over an extended range of wavelengths.

6. A spectropolarimeter as defined in claim 1 wherein said first mentioned means comprises a Faraday coil linking said Faraday core magnetically;
power supply means for said Faraday coil;
said element in said servo loop being a variable impedance element in said power supply means; and
said scanning control means comprising adjustment means interconnecting said monochromator and said variable impedance element for varying the amplitude of the alternating current supplied to said Faraday coil from said power supply means as an inverse function of the Verdet constant of said material whereby a change in said amplitude caused by a change in the Verdet constant as said wavelength is changed is counteracted whereby the operation of said servo loop is stabilized over an extended range of wavelengths.

7. In a self-balancing spectropolarimeter of the type described in claim 1, wherein said beam of monochromatic light is transmitted from said monochromator to a polarizer, then to the sample cell and the Faraday core, and then to the analyzer, the improvement of claim 1, wherein:
said rotation control means is a servo means for rotating said polarizer.

8. A spectropolarimeter as defined in claim 7 comprising:
attenuation means incorporated in said amplifier means for varying the amplification of said alternating current, said attenuation means including a variable impedance element; and
said scanning control means comprising adjustment means interconnecting said monochromator and said variable impedance element for varying said attenuation as a function of the wavelentgh of the monochromatic light beam developed by said monochromator whereby the amplification of said alternating output current by said amplifier means is varied inversely as a function of the Verdet constant of said material.

9. A spectropolarimeter as defined in claim 7 wherein said rotation control means comprises further means proportionally driven by said servo means for indicating the amount of rotation of said polarizer from a reference position to provide an indication of the optical rotation produced by a sample.

10. A spectropolarimeter as defined in claim 1 wherein said beam of monochromatic light is transmitted from said monochromator to a polarizer, then to the sample call and the Faraday core, and then to the analyzer, the improvement of claim 1, wherein: said rotation control means comprises a first servomotor connected to rotate said polarizer and a recorder including a displaceable recording element controlled by a second servomotor that is controlled by said first servomotor for indicating the amount of rotation of said polarizer from a reference position to provide an indication of the optical rotation produced by a sample.

11. A spectropolarimeter as defined in claim 7 wherein said rotation control means comprises a servomotor connected to rotate said polarizer; and
wherein said element comprises an electrical attenuator connected in said amplifier means,
said spectropolarimeter further comprising means controlled by signals which appear at a point in said loop between said element and the output of said loop for indicating the amount of rotation of said polarizer from a reference position.

12. A spectropolarimeter as defined in claim 11 wherein said Faraday core has a face at one end for receiving and transmitting polarized light and has at the other end a mirror for reflecting outwardly through said face light that has entered said core through said face.

13. In a spectropolarimeter of the extinction type wherein a beam of plane polarized monochromatic light developed by a monochromator is transmitted along an optical path in turn to a sample cell and through a Faraday core, and then to an analyzer, to be extinguished by said analyzer, and wherein said Faraday core is subjected to the influence of a magnetic field having an alternating component whereby the plane of polarization of said beam oscillates about a mean position with an amplitude of oscillation that varies with the wavelength of the monochromatic beam in accordance with the Verdet constant of material in said core;
electrical detecting and amplifying means including a photomultiplier for receiving light after being affected by said analyzer and responsive to said received light for developing an amplified alternating current that has a current amplitude that varies with the oscillation amplitude of said plane of polarization from the mean position thereof; and
scanning control means connected to said monochromator to vary the wavelength of the monochromatic light transmitted along said path and also connected to said detecting and amplifying means for varying the amplification factor thereof as an inverse function of the wavelength of the monochromatic light over an extended range of wavelengths.

14. A spectropolarimeter as defined in claim 13 comprising:
attenuation means incorporated in said detecting and amplifying means for varying the amplification of said alternating current, said attenuation means including a variable impedance element, and
said scanning means comprising adjustment means interconnecting said monochromator and said variable impedance element for varying said attenuation as a function of the wavelength of the monochromatic light beam developed by said monochromator whereby the amplification of said alternating output current by said detecting and amplifying means is varied inversely as a function of the Verdet constant of said material.

15. In a spectropolarimeter of the extinction type wherein a beam of plane polarized monochromatic light developed by a monochromator is transmitted along a light path, in which said beam is polarized in a predetermined plane and thereafter passed through a sample cell and through a core of a Faraday cell having a Faraday coil, and then to an analyzer, to be extinguished by said analyzer:
   a first amplitude control means for applying an alternating modulating current to said coil, whereby the plane of polarization of said beam oscillates about a mean position by an amplitude that varies with wavelength of the monochromatic beam in accordance with the Verdet constant of material in the core of said Faraday cell;
   a second amplitude control means including a photomultiplier for receiving light transmitted through said analyzer and responsive to said received light for developing an amplified alternating output current that varies in amplitude with the oscillation amplitude of said plane of polarization from the mean position thereof;
   the amplitude of said alternating output current varying with the amplitude of said modulating current and the gain of said second amplitude control means and the deviation of the plane of polarization of said beam from the crossed position relative to the polarization plane of said analyzer;
   motor means controlled by the alternating output current for rotating the mean position of the plane of polarization relative to the polarization plane of said analyzer to produce a crossed condition of said beam and said analyzer; and
   scanning control means connected to said monochromator to vary the wavelength of the monochromatic light and also connected to one of said amplitude control means for counteracting a change in amplitude of said output alternating current caused by a change in Verdet constant of the material in said core.

16. A spectropolarimeter as defined in claim 15 comprising:
   means controlled by said scanning control means for varying the gain of said second amplitude control means as an inverse function of the Verdet constant as the wavelength of the monochromatic light is changed by said scanning means.

17. A spectropolarimeter as defined in claim 15 comprising:
   means controlled by said scanning control means and acting on said first amplitude control means for varying the amplitude of the alternating modulating current applied to said coil as an inverse function of said Verdet constant as the wavelength of the monochromatic light is changed by said scanning means.

References Cited

UNITED STATES PATENTS

| | | | |
|---|---|---|---|
| 2,341,422 | 2/1944 | Bubb | 356—33 |
| 2,984,149 | 5/1961 | Herscher et al. | |
| 3,164,662 | 1/1965 | Grosjean et al. | |
| 3,312,141 | 4/1967 | Cary. | |

OTHER REFERENCES

Brode et al.: A Recording Spectrophotometer and Spectropolarimeter, The Journal of the Optical Society of America, vol. 31, December 1941, pp. 743–749.

RONALD L. WIBERT, Primary Examiner

F. W. EVANS, Assistant Examiner

U.S. Cl. X.R.

356—117; 250—225